US008606627B2

(12) United States Patent
König et al.

(10) Patent No.: US 8,606,627 B2
(45) Date of Patent: Dec. 10, 2013

(54) SPONSORED SEARCH DATA STRUCTURE

(75) Inventors: Arnd Christian König, Kirkland, WA (US); Martin Miroslavov Markov, Redmond, WA (US); Kenneth Ward Church, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1053 days.

(21) Appl. No.: 12/137,567

(22) Filed: Jun. 12, 2008

(65) Prior Publication Data
US 2009/0313115 A1 Dec. 17, 2009

(51) Int. Cl.
*G06Q 40/00* (2012.01)
*G07G 1/14* (2006.01)

(52) U.S. Cl.
USPC .............................. 705/14; 709/217

(58) Field of Classification Search
USPC ............... 705/14.69, 14.72, 35; 707/769, 812
See application file for complete search history.

(56) References Cited

U.S. PATENT DOCUMENTS

| | | | | |
|---|---|---|---|---|
| 5,734,887 | A * | 3/1998 | Kingberg et al. ..................... | 1/1 |
| 6,269,361 | B1 * | 7/2001 | Davis et al. ........................... | 1/1 |
| 7,657,611 | B2 * | 2/2010 | Tsun et al. ...................... | 709/219 |
| 7,668,798 | B2 * | 2/2010 | Scanlon et al. ................ | 707/713 |
| 7,788,159 | B1 * | 8/2010 | Sack ................................ | 705/37 |
| 2002/0052894 | A1 * | 5/2002 | Bourdoncle et al. ........... | 707/513 |
| 2004/0243660 | A1 * | 12/2004 | Chew et al. ..................... | 709/200 |
| 2004/0249713 | A1 * | 12/2004 | Gross ............................... | 705/14 |
| 2005/0050023 | A1 * | 3/2005 | Gosse et al. ....................... | 707/3 |
| 2005/0074102 | A1 * | 4/2005 | Altberg et al. .............. | 379/114.1 |
| 2005/0102270 | A1 * | 5/2005 | Risvik et al. ....................... | 707/2 |
| 2005/0119957 | A1 * | 6/2005 | Faber et al. ...................... | 705/35 |
| 2005/0125307 | A1 * | 6/2005 | Hunt et al. ....................... | 705/26 |
| 2005/0154718 | A1 * | 7/2005 | Payne et al. ...................... | 707/3 |
| 2005/0240557 | A1 * | 10/2005 | Rorex et al. ...................... | 707/1 |
| 2006/0129555 | A1 * | 6/2006 | Burdick et al. ................... | 707/7 |
| 2006/0212350 | A1 * | 9/2006 | Ellis et al. ....................... | 705/14 |
| 2008/0133477 | A1 * | 6/2008 | Patel ................................ | 707/3 |
| 2008/0306943 | A1 * | 12/2008 | Patterson ......................... | 707/6 |

OTHER PUBLICATIONS

Anh, et al. "Vector-Space Ranking with Effective Early Termination." In Proceedings of the 24th annual international ACM SIGIR Conference, pp. 35-42, 2001.
Arasu, et al. "Efficient Exact Set-similarity Joins." In VLDB, 2006.
Ausiello, et al. "Greedy Algorithms for On-line Set-Covering and related Problems." In Proc. of CATS, pp. 145-151, 2006.
Buttcher, et al. "Index Compression is Good, Especially for Random Access." In In Proceedings of CIKM, 2007.

(Continued)

*Primary Examiner* — Chika Ojiaku
(74) *Attorney, Agent, or Firm* — Medley, Behrens & Lewis, LLC

(57) ABSTRACT

A system that facilitates selecting advertisements that match a search query is described herein. The system includes a search query receiver component that receives a search query including keywords. The system also includes a match component that uses an associative data structure to identify in the associative data structure one or more data nodes that are associated in the associative data structure with respective unique keys corresponding to respective one or more hashes of combinations of the keywords in the search query. For each identified data node, the match component selects advertisements associated with bid phrases stored in the identified data node that respectively only include keywords included in the search query.

20 Claims, 8 Drawing Sheets

(56) References Cited

OTHER PUBLICATIONS

Callison-Burch, et al. "Scaling Phrase-based Statistical Machine-Translation to Larger Corpora and Longer Phrases." In Proceedings of ACL, pp. 255-262, 2005.

Cohen, et al. Processing Top-k Queries from Samples. In Proceedings of CoNext, 2006.

U. Feige. "A Threshold of In n for Approximating Set Cover." Journal of the ACM, 45(4):634-652, 1998.

Hassin, et al. "A Better-Than-Greedy Approximation Algorithm for the Minimum Set Cover Problem." SIAM J. Comput., 35(1):189-200, 2005.

Heinz, et al. "Burst Tries: A Fast, Efficient Data Structure for String Keys." ACM Trans. Inf. Syst., 20(2):192-223, 2002.

N. Mamoulis. "Efficient Processing of Joins on Set-valued Attributes." In ACM SIGMOD, pp. 157-168, 2003.

Melnik, et al. "Adaptive Algorithms for Set Containment Joins." ACM TODS, 28(1):56-99, 2003.

Sarawagi, et al. "Efficient Set Joins on Similarity Predicates." In ACM SIGMOD, pp. 743-754, 2004.

Strohman, et al. "Efficient Document Retrieval in Main Memory." In 30th ACM SIGIR International Conference, pp. 175-182, 2007.

Zhang, et al. "An Efficient Phrase-to-Phrase Alignment Model for arbitrarily long Phrases and large Corpora." In Proc. of EAMT, 2005.

\* cited by examiner

SPONSORED SEARCH DATA STRUCTURE

BACKGROUND

Computer systems are often used to search for documents such as web pages, computer files, or any other type of electronic document. In many instances, a user desiring to search for documents may use a browser to access a search engine available on a remote server. The user typically provides a search query to the search engine. In response to receiving the search query, the search engine returns to the browser of the user one or more web pages that include a search results list of documents matching the search query. The search results list typically includes a hypertext link to each identified document as well as a sample of relevant text from each identified document.

Such search queries typically include one or more keywords. A search results list generated by the search engine typically displays a listing of documents that have all of the words included in the query. The search engine may also insert one or more advertisements in the web page(s) that include the search results list. Such advertisements may be selected by the search engine based at least in part on the words included in the search query. The selection and display of such advertisements adjacent a related search results list is referred to herein as a sponsored search.

For a sponsored search, the search engine may have access to millions of advertisements provided by advertisers. The advertisers providing the advertisements typically specify the circumstances under which their advertisements are to be selected for display adjacent a search results list. Such circumstances may include a bid phrase that is provided by the advertiser and stored in association with advertisement data capable of being used to form the advertisement displayed adjacent a search results list. The bid phrase may include one or more words. The search engine may select an advertisement for display adjacent a search results list based at least in part on broad-match semantics in which all of the words of the bid phrase for the advertisement must be included in the search query for which the search results are generated.

Using conventional search mechanisms (such as inverted indexes) for selecting advertisements with broad-match semantics is computationally expensive. Furthermore, inefficiencies associated with using conventional search mechanisms for selecting advertisements can significantly delay carrying out a sponsored search.

SUMMARY

The following is a brief summary of subject matter that is described in greater detail herein. This summary is not intended to be limiting as to the scope of the claims.

Described herein are various technologies relating to selecting advertisements associated with user provided search queries including keywords. Each advertisement available to be selected is typically associated with a bid phrase that includes one or more words. The particular advertisements selected for a given search query have bid phrases in which all of the words included in the bid phrase for the advertisement are included in the search query. Matching bid phrases to search queries in this manner is referred to herein as a broad-match. The technologies described herein may also relate to other types of matching schemes including exact match and phrase match.

To facilitate matching bid phrases to search queries, examples described herein may use an index framework that does not employ inverted indexes on the words of a corpus of bid phrases. Rather, example systems may use an index framework that includes an associative data structure in which unique keys (corresponding to hashes of sets of words included in bid phrases) are used as pointers to find variable length data nodes including advertisements with corresponding bid phrases. The associative data structure may be selectively optimized to include advertisements with bid phrases in each node, which bid phrases include not only the set of words used to generate the unique key to the data node, but also additional words. Optimization may be carried out based on a cost model of memory access for different portions of the associative data structure stored in particular memory.

To select advertisements for a given search phrase, sets of keywords in a search query may be hashed. Unique keys can be located in the associative data structure which match the hashes generated from the search query. Contents of the data nodes associated with these unique keys may be analyzed to find advertisements with bid phrases in which all of the words in each respective bid phrase are included in the search query. In these examples, advertisements with bid phrases with additional words not included in the search query are not selected.

In addition, the set of advertisements with matching bid phrases may be further filtered based on secondary criteria, such as a bid amount and historical use of the advertisement. The final set of advertisements determined for a search query may then be included in one or more web pages that include lists of documents that contain the keywords of the search query.

Other aspects will be appreciated upon reading and understanding the attached figures and description.

DETAILED DESCRIPTION

Figure 1:
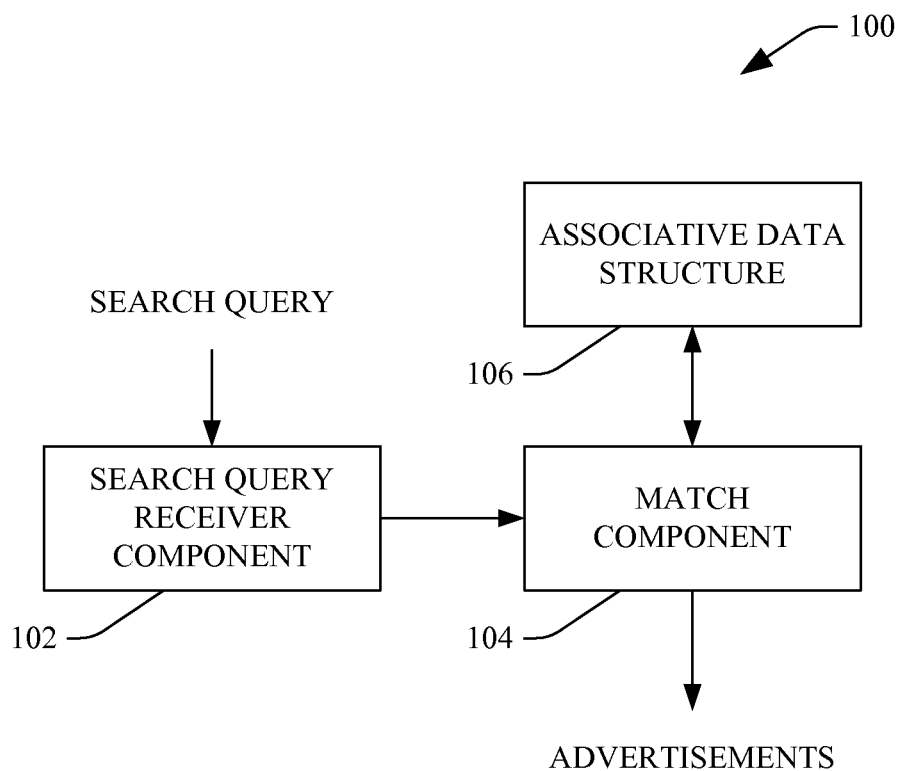
FIG. 1 is a functional block diagram of an example system that facilitates selecting advertisements using an associative data structure.

Various technologies pertaining to matching advertisements with search queries will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 is illustrated that facilitates sponsored search in which advertisements are selected that match a search query. The example system 100 includes a search query receiver component 102 that receives a search query including keywords. The system further includes a match component 104 that uses an associative data structure 106 to select advertisements from a corpus of advertisements. Each of the advertisements provided by advertisers is associated with a bid phrase that includes one or more words. The match component 104 uses the associative data structure to find advertisements having associated bid phrases with words that match the received search query. Example structures for the associative data structure 106 as well as mechanisms for substantially optimizing the associative data structure 106 will be described in more detail below.

The match component 104 may use broad-match semantics to match bid phrases to search queries. Broad-match semantics require that all of the words in a bid phrase associated with a matching advertisement must be in the search query, but not vice versa (e.g. all of the words in the search query do not need to be in the bid phrase). As an example, the bid phrase, "used books", using broad-match semantics will match the search query "cheap used books", but not the search queries, "books" or "comic books". In additional or alternative examples, the match component 104 may employ other types of matching semantics for comparing a bid phrase with a search query such as exact match (e.g. the bid phrase and search query are substantially identical) and phrase match (e.g. word combinations in the bid phrase and search query are substantially identical).

Figure 2:
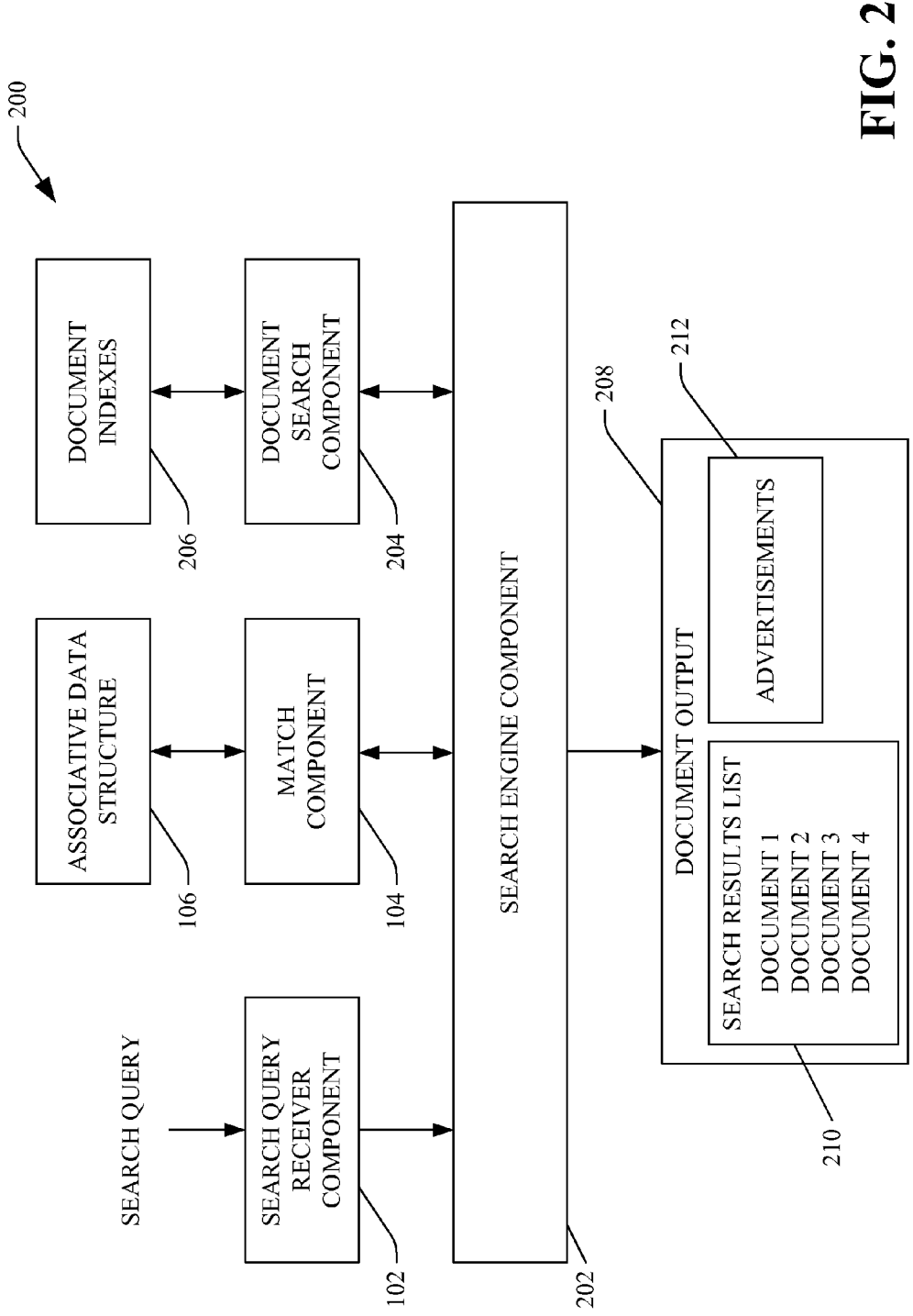
FIG. 2 is a functional block diagram of an example system that facilitates identifying documents and selecting advertisements to display adjacent lists of the identified documents.

FIG. 2 illustrates a further example system 200 in which the described matching component 104 may be used to select advertisements based at least in part on a search query received from the search query receiver component 102. In this described example, the system 200 may include a search engine component 202. The search engine component 202 may include the match component 104. In addition, the search engine component 202 may include a document search component 204. The document search component 204 can identify, from a corpus of document, documents that include the keywords of the search query. To facilitate identifying documents that include keywords, the system 200 may include document indexes 206 such as inverted indexes which index all of the individual words in the corpus of documents.

The example search engine component 202 generates a document output 208 such as a web page that includes a search results list 210 of the identified documents. Such a list may include hyperlinks to network addresses at which the identified documents can be accessed. The search results list 210 may also include samples of the text included in the identified documents. In addition, the search component 202 may include in the generated document output (e.g. the web page) one or more selected advertisements 212 (determined by the match component 104) that match the search query used to identify the documents included in the search results list 210.

As used herein, a document corresponds to any electronic item capable of being accessed. A typical example of a document includes a web page. However, a document also includes any type of file or other object capable of being stored on a computer system, server and/or network. Other examples of documents include word processing files, text files or any other type of electronic item that includes searchable content.

Also as used herein, a search query corresponds to one or more words (also referred to herein as keywords) capable of being present in the content of a document. Also, as used herein a bid phrase corresponds to one or more words capable of being included in a search query. Such words in the bid phrase and keywords in the search query typically include alphanumeric text or other language symbols. Such words, however, may or may not correspond to words found in a dictionary. For example, words may correspond to other individual or groupings of numbers, letters, and/or language symbols such as an error code, serial number, model number, or any other information capable of being found in a document.

Also, as used herein, an advertisement corresponds to information that is capable of being visually and/or audibly perceived by a user receiving the advertisement in a web page or other electronic form. Advertisements may include text, graphics, illustrations, images, hypertext links, sounds, music, video, animation, software interfaces, and/or any other output perceivable by a human.

Although the described system 200 is shown as outputting advertisements adjacent a search results list of documents, it is to be understood that the system 200 may be employed in alternative systems which involve other types of searches using keywords. Such alternative systems for example may include a search engine that searches for files on a local hard drive using keywords and displays a list of the files along with advertisements that match the search query used to look for the files.

Of an initial set of advertisements that match a search query based on broad-match semantics (or other type of semantics), the match component 104 may further reduce the initial set of advertisements by applying one or more filters. For example, in addition to being associated with a bid phrase, advertisements may also be associated with secondary criteria data, such as: bid price, keyword-exclusion, clicked through rate, overlap with advertisements displayed earlier, and/or other factors associated with matching advertisements. A remaining set of matched advertisements after having applied the filter based on secondary criteria data may be viewed as having won an auction for a particular search query. The search engine component 202 may then rank the advertisements that won the auction and include such advertisements 212 in order by rank adjacent the search results list 210 in the document output 208.

In broad-match semantics, the roles of the search query and corpus of advertisement being searched are reversed compared to the role of the search query and corpus of documents being searched. For example, in a search to identify documents, the retrieval task of the document search component 204 is typically to identify documents containing a superset of the keywords occurring in a search query from an indexed corpus of documents. In contrast, when searching for advertisements using broad-match semantics, the indexed corpus includes the bid phrases associated with individual advertisements, and the retrieval task carried out by the match component 104 is to retrieve all advertisements whose bid phrases include a subset of the words in the search query.

Although the document search component 204 may use document indexes 206 that correspond to inverted indexes, in a search for advertisements, such inverted indexes may result in inefficiencies for many types of bid phrases and search queries that include common words. To reduce such inefficiencies, the match component 104 may use an index framework with an associative data structure 106 that is constructed and/or substantially optimized for faster matching (relative to the use of inverted indexes) of bid phrases to search queries using broad-match semantics or other type of query semantics (e.g. exact match or phrase match).

Figure 3:
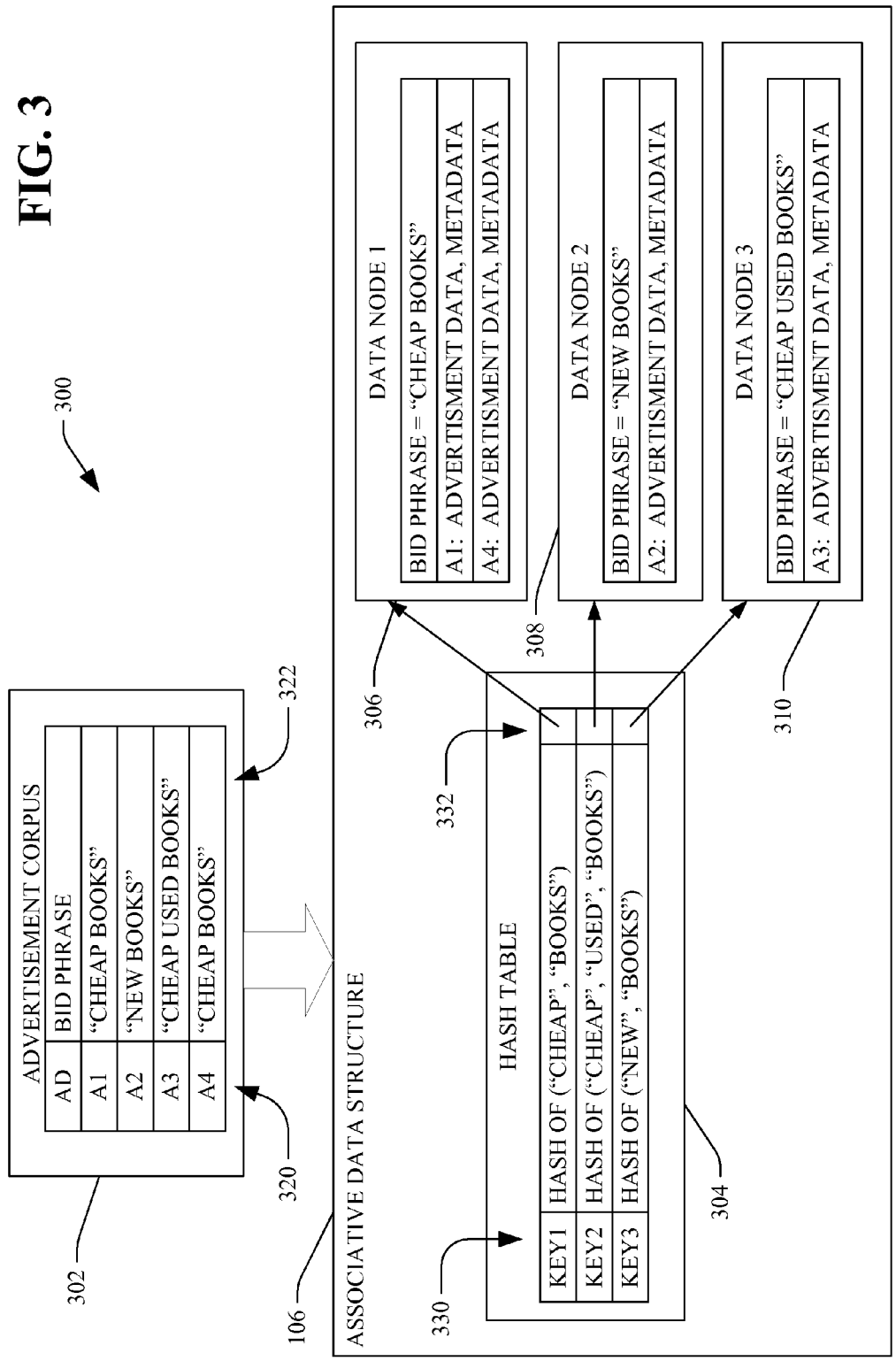
FIG. 3 is a functional block diagram of an example system that facilitates optimizing an associative data structure used to select advertisements.

FIG. 3 illustrates an example 300 of an associative data structure 106. The example data structure 106 includes a corpus of advertisement data 302 that is stored or mapped into the associative data structure 106. The corpus of advertisement data 302 includes four advertisements (A1, A2, A3, A4) 320, each associated with a bid phrase 322. The associative data structure 106 includes a hash table 304 generated from the corpus of advertisements. The hash table 304 includes items stored therein, which each include a unique key 330 associated with a pointer 332. In this example, the hash table 304 is shown with three items with three unique keys (KEY1, KEY2, KEY3) 330. These unique keys correspond to the unique (e.g. duplicates removed) hash values generated from hashing each of the bid phrases 322 of the advertisement data 302 with a hash function. The unique keys may be generated from hashes of combinations of words in which the words are combined (e.g. concatenated) in a predetermined sorted order (e.g. alphanumerically) prior to generating hashes of the combination of words in the bid phrases. In FIG. 3, the hash table 304 is shown with only three unique keys 330, because two of the advertisements are associated with the same bid phrase ("e.g. "CHEAP BOOKS") which result in identical hashes.

As illustrated in FIG. 3, each of the unique keys 330 in the data structure can be associated with a pointer 332 to a respective variable-length data node 306, 308, 310. Each respective data node for a respective unique key includes and/or references the particular advertisements with bid phrases that correspond to the respective unique key that referenced the respective data node. Also each data node may include or reference for each advertisement the advertisement data used to display and/or generate the advertisement. Further, each data node may include or reference for each advertisement, various metadata such as the secondary criteria data discussed previously (e.g. bid price, keyword-exclusion, etc.).

Although the associative data structure 106 has been described as including a hash table that points to data nodes, in alternative examples, the associative data structure may have other forms such as a tree structure or any other associative data structure that supports variable sized data at the node (or via pointer indirection) itself.

Also, a special case for broad-match queries may be posed by bid phrases and search queries that include multiple occurrences of the same word. For example, search query users tend to issue short non-redundant queries. Thus multiple occurrences of the same word typically carry meaning For example, the string: "Talk Talk" likely refers to a pop band of the same name and should not be matched to a bid containing only "Tall'. Hence, the correct semantics for multiple word occurrences in broad-matches may be defined to be that any word occurring multiple times should occur with the same frequency in both the search query and the bid phrase. Hence, multiple occurrences of a word may be treated in example systems as a special single word (e.g., two occurrences of the word "Talk" become a single word "Talk Talk") in both bid phrases as well as search queries for the purpose for broad-match processing.

To process a search query with multiple keywords, using the described associative data structure 106, the match component and/or search engine component 202 generates hash values from all subsets (e.g. different combinations of words) of the keywords of the search query. For each hash, the combinations of keywords may be combined (e.g. concatenated) in a predetermined sorted order (e.g. alphanumerically) prior to generating hashes from the combination of keywords in the search queries. The match component uses the hash table 304 to locate unique keys 330 that are identical to the hash values generated from the search query. The match component 104 uses the located unique keys to lookup their respective data nodes and retrieve all advertisements from the data nodes with bid phrases that have all of their words included in the search query. These retrieved advertisements correspond to the candidate advertisements which may then be further filtered as described previously using the secondary criteria data associated with the candidate advertisements.

This described example approach to the broad-match retrieval of advertisements in practice may almost entirely be constrained by main memory latency because the vast majority of data is not cache-resident. For very short search queries, this scheme may perform well (compared to using inverted indexes), as there are only few corresponding subsets of words that generate unique hash keys. Thus the number of lookups against the hash table 304 to locate corresponding data nodes 306, 308, 310 is limited. However, for longer search queries (e.g. with many multi-word subsets of the keywords) the number of lookups against the hash table grows exponentially with the number of words in the search query.

Figure 4:
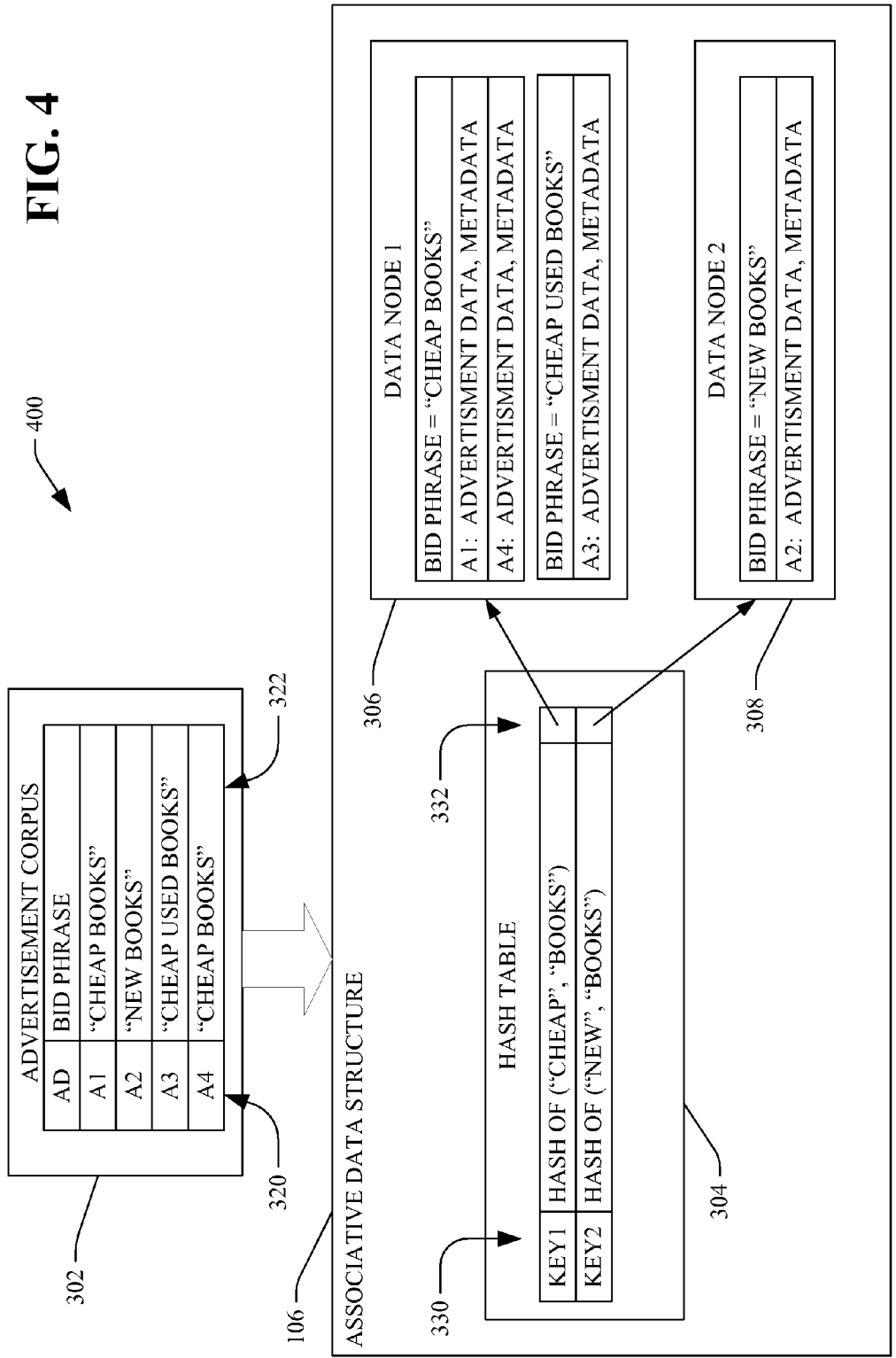
FIG. 4 is a functional block diagram illustrating an example mapping of advertisements in an associative data structure.

To further increase the performance of the described example systems, the associative data structure 106 may be selectively optimized. FIG. 4 depicts an example 400 of the associative data structure 106 which has been optimized (e.g. remapped) to reduce the number of data nodes that need to be looked up using a hash table 304. Here, the third advertisement A3 (shown in FIG. 3 in its own data node 310) has been remapped to the data node 306 containing the advertisements A1 and A4 as well. Thus the bid phrase "cheap used books " associated with the advertisement A3 is now stored in the data node 306 under the bid phrase "cheap books " associated with the advertisements A1 and A4. In this example, within a data node, all advertisements are ordered by the number of words in their bid phrases.

Such a remapping saves memory space by eliminating an entry in the hash table 304. Further, the re-mapping also takes advantage of fast sequential memory accesses in that—on average—more data is read per hash-table lookup, but fewer hash-table lookups to data nodes become necessary. Query semantics will remain as before, as any reference to the subset, "cheap books ", will consider all supersets including "cheap used books".

In this described example, for bid phrases that have two or more words, the corresponding unique keys for the hash table correspond to a combination of at least two words in the bid phrase. Thus, multi-word bid phrases are not associated with unique keys in the hash table that are generated from only a single word in the bid phrase. However in further examples, unique keys may be derived from hashes of individual words in bid phrases. Also in examples, for a bid phrase with more than two words, the combination of two words selected for its unique key may correspond to the rarest words in the bid phrase with respect to the corpus of bid phrases.

If all advertisements from the data nodes associated with bid phrases with more than a given set of words (e.g. more than two words) are distributed to existing nodes in this manner, there may be: (i) reduced random access (from the hash table to the data nodes) when processing any search query with large numbers of words: and (ii) a reduced number of entries in the hash-table, which in turn saves space and potentially increases access locality. However, re-mapping data nodes reduces the number of random accesses at the expense of additional sequential data reads at the nodes to retrieve and analyze the contents of the data nodes. Thus, for example, higher efficiency optimizations of the associative data structure may be achieved by selectively remapping only some of the advertisements with more than two words in their bid phrases to other data nodes.

Figure 5:
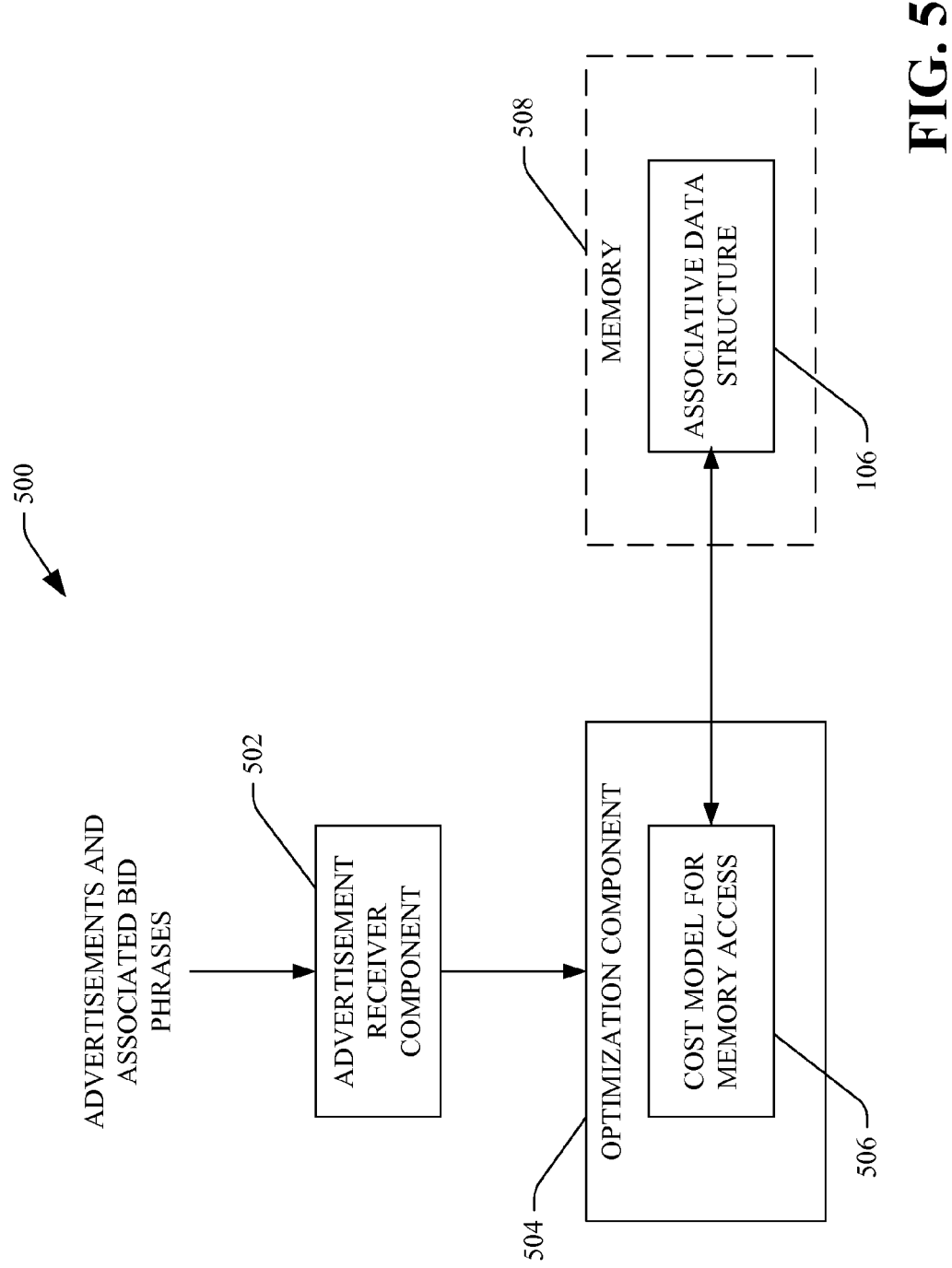
FIG. 5 is a functional block diagram illustrating an example optimized mapping of advertisements in an associative data structure.

FIG. 5 illustrates an example system 500 that may be used to optimize the associative data structure 106. Here the system may include an advertisement receiver component 502 that receives advertisements and their associated bid phrases. The system 500 may also include an optimization component 504 that determines whether to store advertisements and their associated bid phrases in existing or new data nodes of the associative data structure 106.

The optimization component 506 may be used to remap an existing associative data structure 106. The optimization component 506 may also be used to generate an initial associative data structure 106 given a corpus of advertisements. In addition, the optimization component 506 may be used to determine in which data nodes (new or existing) additional advertisements received from advertisers are to be stored. Further, the optimization component 506 may be used to re-optimize a previously optimized associative data structure 106 given a change in circumstances such as: insertions/deletions of advertisements; a change in the memory architecture of the system; and changes in the types and length of search queries received by the system.

The optimization component may use a cost model 506 for memory access constructed at least in part in view of characteristics of the memory 508 in which the associative data structure is stored. Such a memory may correspond to DRAM. However, in alternative examples, the memory may correspond to a hard drive, flash memory device, or any other type of data store. In order to find higher efficiency optimizations of the associative data structure 106, a cost model may be used that distinguishes between sequential and random memory accesses, since these different types of memory accesses typically have different performance characteristics.

Thus a cost model may be used that is capable of determining whether to include a received bid phrase in a data node in the associative data structure based at least in part on a balancing between: an estimated cost of random access from the hash table to the data nodes; and an estimated cost to sequentially access the contents (e.g. bid phrases) stored in a data node. In addition, an example cost model may be constructed at least in part in view of the knowledge of the relative frequency at which different types and lengths of search phrases are queried, so as to quantify how much remapping of data nodes is effective at reducing the overall selection of bid phrases that match a search query. Also an example cost model may also be constructed that is capable of determining whether to include a received bid phrase in a data node in the associative data structure based at least in part on the number of words in the bid phrase.

With respect to the architecture of DRAM memory, random access into memory may incur latency because of a number of factors such as: (a) L1 and L2 cache misses; (b) misses in a translation lookaside buffer (TLB) which maps virtual memory addresses to physical ones; and (c) DRAM design (e.g. random accesses that cannot use the burst-read mode of DRAMs). In order to assess the expected access latency of the associative data structure without actually executing a query workload on it, a cost model may be used to approximate the "cost" Cost _Random to a random access from the hash table to data, and a "cost" $Cost_{Scan}$ to a sequential access of the data nodes. The optimal solution to this cost model will balance these two costs to maximum throughput for an expected workload of the match component.

To find the substantially optimal associative data structure for a given search query workload, the cost-model may include solving or approximating a solution for a weighted set cover problem. Solving a general set cover may be NP-hard. However, the specific weighted set-cover problem associated with the described example system includes an internal structure that is amenable to fast approximate solutions with tight bounds on accuracy.

For example, a constraint that can be used to find a fast approximation algorithm for the described cost model is that any time a proposed modified data node contains sufficiently many advertisements such that accessing the "last" set of words in the data node by a sequential scan of the data node has higher cost than a random access to data nodes, then this proposed modified data node should not be part of the optimal solution, as accessing these advertisements would be less expensive if they were stored at their original location. Because the difference in latency between random and sequential access in main memory is much less pronounced than it is for disk-resident data (even when aggravating factors such as TLB misses are taken into account), this characteristic may effectively limit the size of a data node to a small numbers of advertisements. An example cost model may thus be used which takes into account a predetermined maximum number of advertisements that can be grouped in a single data node without violating the above constraint.

Figure 6:
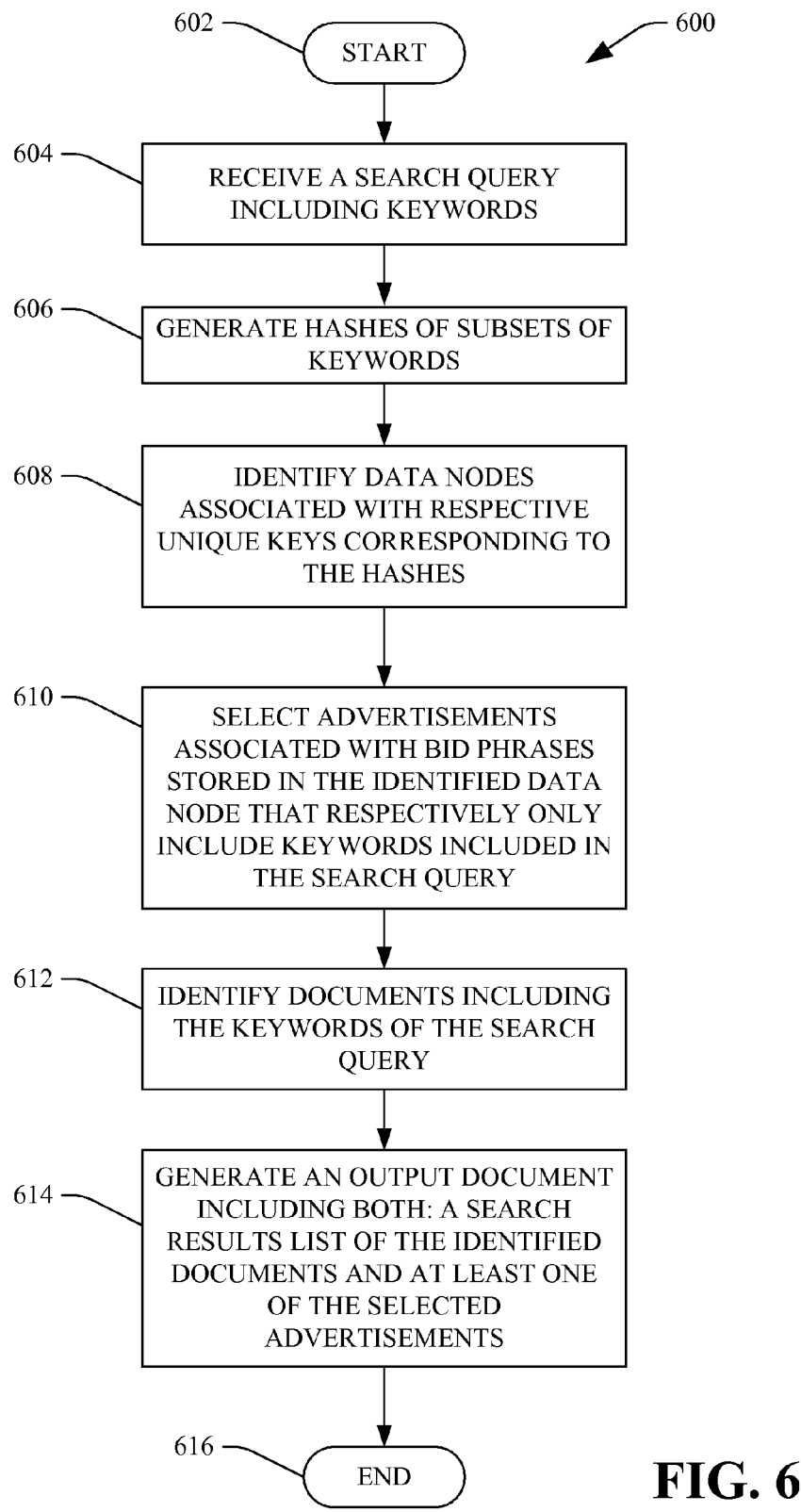
FIG. 6 is a flow diagram that illustrates an example methodology for identifying documents and selecting advertisements to display adjacent lists of the identified documents.
Figure 7:
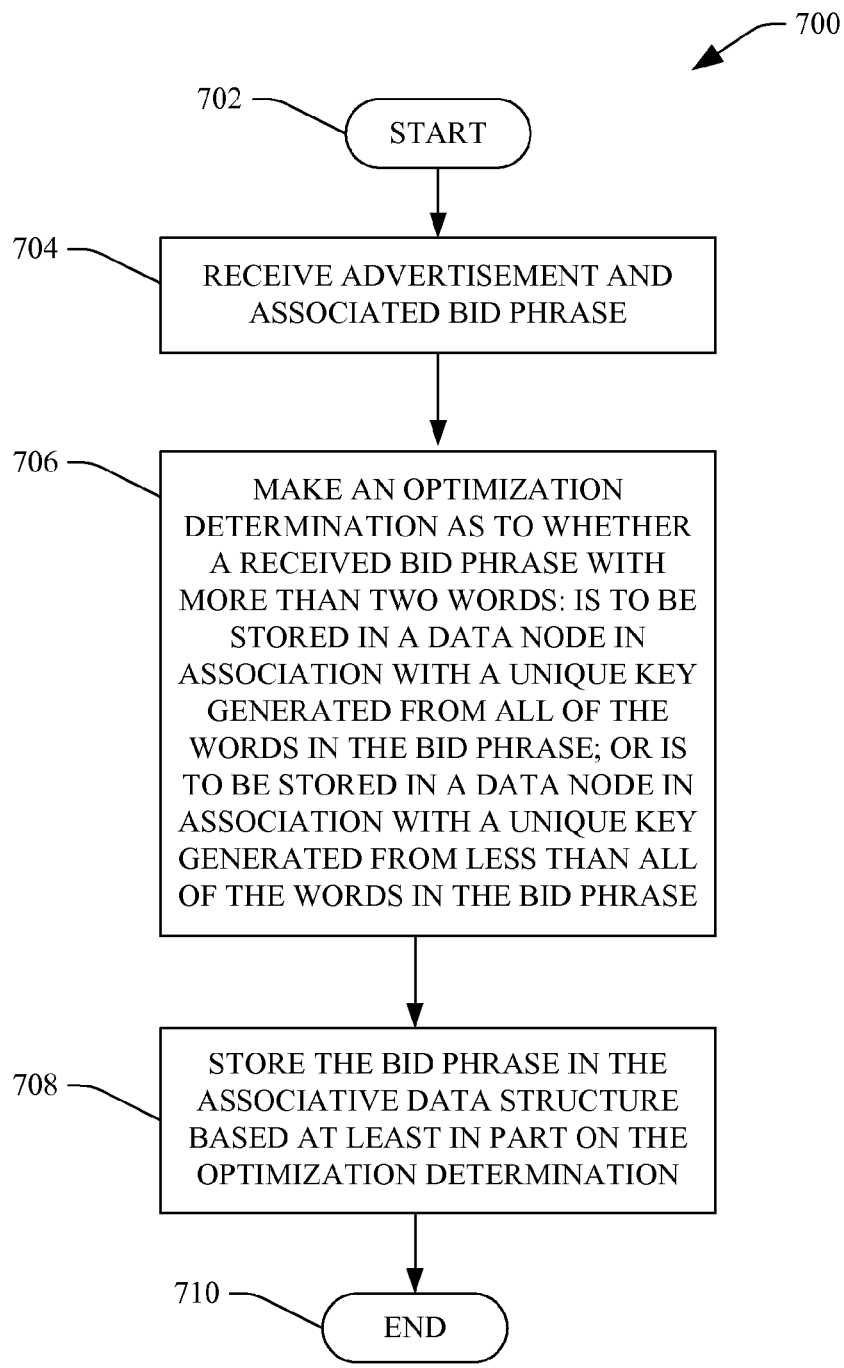
FIG. 7 is a flow diagram that illustrates an example methodology for optimizing an associative data structure.

With reference collectively to FIGS. 6 and 7, various example methodologies are illustrated. While these methodologies are described as being a series of acts that are performed in a sequence, it is to be understood that the methodologies are not limited by the order of the sequence. For instance, some acts may occur in a different order than what is described herein. In addition, an act may occur concurrently with another act. Also, an act can correspond to inaction such as a time delay. Furthermore, in some instances, not all acts may be required to be implemented in a methodology described herein.

Moreover, the acts described herein may be computer-executable instructions that can be implemented by one or more processors and/or stored on a computer-readable medium, media, or articles. The computer-executable instructions may include a routine, a sub-routine, programs, a thread of execution, and/or the like. Still further, results of acts of the methodologies may be stored in a computer-readable medium, displayed on a display device, and/or the like.

Now referring to FIG. 6, an example methodology 600 for selecting advertisements that match a search query is illustrated for use with a search engine. The methodology starts at 602, and at 604 a search query is received. At 606, hashes are generated from multi-word subsets (e.g. different combinations of at least two words) of the keywords included in the search query. At 608, data nodes in an associative data structure are identified which are associated with unique keys corresponding to the hashes of the search query. At 610, for each identified data node, advertisements are selected that are associated with bid phrases stored in the identified data nodes that respectively only include keywords included in the search query.

In addition, as illustrated in FIG. 6 at 612, documents are also identified which include the keywords in the search query. At 614, an output document such as a web page or other type of document is generated that includes a search results list of the identified documents as well as at least one of the selected advertisements. The methodology 600 completes at 616.

With reference now to FIG. 7, an example methodology 700 for optimizing an associative data structure for use with selecting advertisements that match a search query is illustrated. The methodology 700 starts at 702, and at 704 an advertisement and associated bid phrase are received. At 706, an optimization determination is made as to where to store a received advertisement having a bid phrase with more than two words in the associative data structure. The optimization determination may include whether to store the advertisement and bid phrase in a data node in association with a unique key generated from all of the words in the bid phrase. The optimization determination may also include whether to store the advertisement and bid phrase in a data node in association with a unique key generated from less than all of the words in the bid phrase. As discussed previously, the optimization decision may be based at least in part on a cost model for memory access. At 708 the received advertisement and bid phrase are stored in the associative data structure based at least in part on the optimization determination. The methodology 700 completes at 710.

Figure 8:
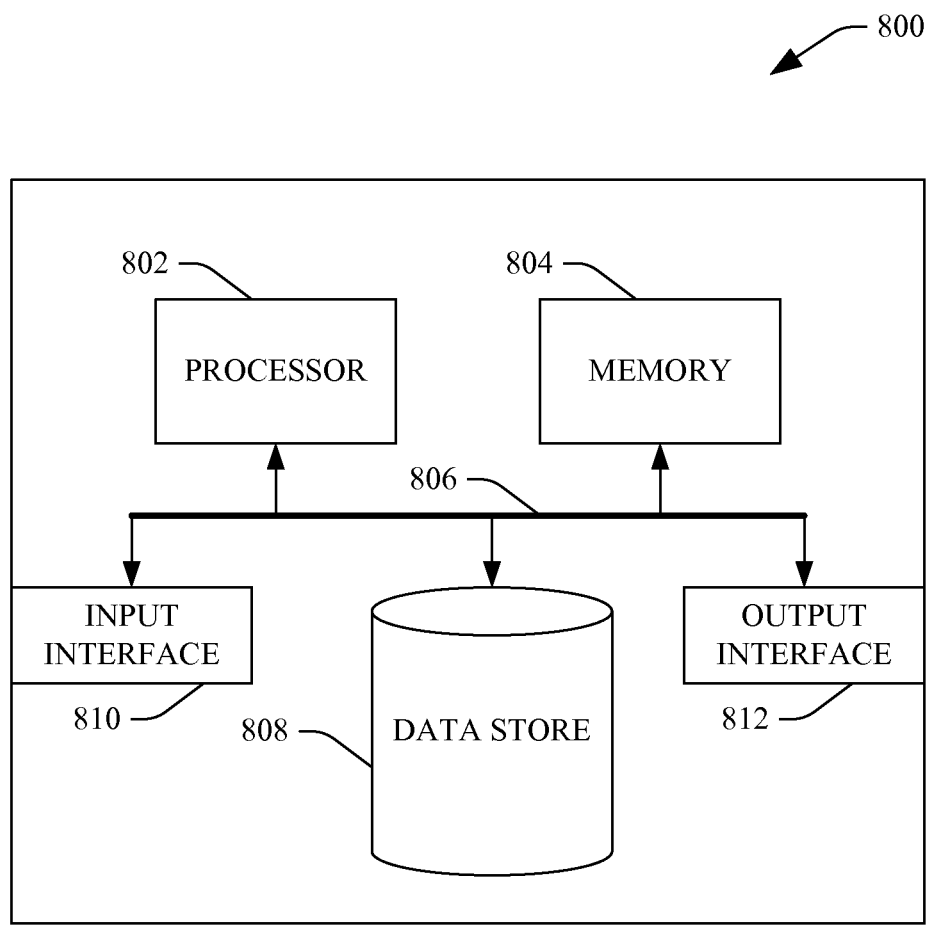
FIG. 8 is an example computing system.

Now referring to FIG. 8, a high-level illustration of an example computing device 800 that can be used in accordance with the systems and methodologies described herein is depicted. For instance, the computing device 800 may be used in a system that facilitates selecting advertisements that match a search query. In addition, the computing device 800 may be employed in connection with the generation, modification, and/or optimization of an associative data structure used to match advertisements with search queries.

The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store documents, advertisements, indexes, an associative data structure, etc.

The computing device 800 additionally includes a data store 808 that is accessible by the processor 802 by way of the system bus 806. The data store 808 may include executable instructions, documents, advertisements, indexes, an associative data structure, etc. The computing device 800 also includes an input interface 810 that allows external devices to communicate with the computing device 800. For instance, the input interface 810 may be used to receive instructions from an external computer device, receive web pages from a web server, receive a request for a web page, etc. The computing device 800 also includes an output interface 812 that interfaces the computing device 800 with one or more external devices. For example, the computing device 800 may transmit data to a personal computer by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system that facilitates selecting advertisements that match a search query, comprising:
   a processor; and
   a memory that comprises a plurality of components that are executed by the processor, the components comprising:
   an advertisement receiver component that receives a plurality of bid phrases and associated advertisement data;
   an optimization component that stores the plurality of received bid phrases in one or more data nodes of an associated data structure, wherein for a received bid phrase amongst the plurality of bid phrases, the optimization component:
   determines that a data node includes a stored bid phrase that comprises a superset of words included in the received bid phrase;
   determines a cost of storing the received bid phrase in the data node based upon an evaluation of a cost model; and
   stores the received bid phrase in either the data node or a disparate data node based at least in part upon the cost;
   a search query receiver component that receives a search query including keywords; and
   a match component that uses the associative data structure to identify in the associative data structure at least one data node that is associated in the associative data structure with respective unique keys corresponding to respective one or more hashes of combinations of the keywords in the search query, wherein for each identified data node, the match component selects advertisements associated with bid phrases stored in the identified data node that respectively only include keywords included in the search query.

2. The system according to claim 1, wherein in the associative data structure, each bid phrase included in each data node is associated with one or more advertisements each including advertisement data usable to output the respective advertisement.

3. The system according to claim 2, wherein each advertisement is further associated with a bid amount usable by the match component to rank the selected advertisements.

4. The system according to claim 2, the plurality of components further comprising a search engine component, wherein the search engine component includes the match component, wherein the search engine component includes a document search component, wherein the document search component uses inverted indexes to identify documents including the keywords of the search query, wherein the search engine component generates an output document including both: a search results list of the identified documents and at least one of the selected advertisements.

5. The system according to claim 1, wherein the optimization component determines the cost based at least in part on a number of words in the bid phrase.

6. The system according to claim 1, wherein the match component selects advertisements with bid phrases that match the search query based on at least one of: broad-match semantics; exact match semantics; or phrase match semantics.

7. The system of claim 1, wherein the combinations of the keywords are arranged in an alphanumerical order.

8. The system of claim 1, wherein the optimization component stores bid phrases in the data node in order of increasing number of words in the respective bid phrases, and wherein the match component ceases selecting advertisements associated with bid phrases stored in the identified data node when a number of words comprised by a bid phrase exceeds the number of words in the search query.

9. The system of claim 1, wherein the evaluation of the cost model by the optimization component is based at least in part upon a predetermined maximum number of advertisements that can be stored in a single data node.

10. The system of claim 1, wherein the associate data structure comprises a hash table that includes the one or more hashes of combinations of the keywords.

11. A method, comprising:
receiving bid phrases and associated advertisement data from advertisers;
storing the received bid phrases in one or more data nodes of an associated data structure, wherein each received bid phrase is stored in the one or more data nodes based at least in part upon an optimization determination, wherein the optimization determination comprises:
determining whether an existing data node from amongst the one or more data nodes comprises a received bid phrase that includes a superset of words comprised by the received bid phrase; and
when the existing data node is determined, storing the respective received bid phrase in either the existing data node or in a disparate data node based at least in part upon evaluation of a cost model;
receiving a search query including keywords;
generating one or more hashes of combinations of keywords in the search query;
identifying in the associative data structure one or more data nodes that are associated in the associative data structure with respective unique keys corresponding to the respective generated one or more hashes;
for each identified data node, selecting advertisements associated with bid phrases stored in the identified data node that respectively only include keywords included in the search query; and
generating an output document including at least one of the selected advertisements, wherein the method is executed by at least one processor of at least one computing device.

12. The method of claim 11, further comprising storing in association with each bid phrase included in each data node, at least one advertisement including advertisement data usable to generate the output document with the respective advertisement.

13. The method of claim 12, further comprising:
using inverted indexes to identify documents including the keywords of the search query; and
generating the output document including both: a search results list of the identified documents and at least one of the selected advertisements.

14. The method of claim 11, further comprising making the optimization determination based at least in part on a number of words in the bid phrase.

15. The method of claim 11, further comprising selecting advertisements with bid phrase that match the search query based on at least one of: broad-match semantics; exact match semantics; and phrase match semantics.

16. The method of claim 11, wherein the combinations of keywords are re-arranged to be in alphanumerical order prior to generating the one or more hashes of the combinations of keywords.

17. The method of claim 11, further comprising making the optimization determination based at least in part upon a maximum number of advertisements that can be stored in a single data node.

18. The method of claim 11, wherein the identifying in the associative data structure one or more data nodes that are associated in the associative data structure with respective unique keys corresponding to the respective generated one or more hashes comprises locating the respective generated one or more hashes in a hash table comprising a plurality of hashes.

19. A processor that is programmed to perform acts comprising:
receiving a search query that includes keywords;
generating one or more hashes of combinations of at least two keywords in the search query;
identifying in an associative data structure one or more data nodes that are associated in the associative data structure with respective unique keys corresponding to the respective generated one or more hashes;
for each identified data node, selecting advertisements associated with bid phrases stored in the identified data node that respectively only include keywords included in the search query;
using inverted indexes to identify documents including the keywords of the search query;
generating an output document including both: a search results list of the identified documents and at least one of the selected advertisements;
receiving bid phrases and associated advertising data for outputting advertisements;
making an optimization determination as to whether a received bid phrase: is to be stored in a data node in association with a unique key generated from all of the words in the bid phrase; or is to be stored in a data node in association with a unique key generated from a subset of words in the bid phrase, the optimization determination made based upon evaluation of a cost model; and
storing the bid phrase and associated advertising data in the associative data structure based at least in part on the optimization determination.

20. The processor of claim 19, wherein the associative data structure comprises a hash table that includes a plurality of hashes, and wherein the identifying in the associative data structure one or more data nodes that are associated in the associative data structure with respective unique keys corresponding to the respective generated one or more hashes comprises identifying the respective generated one or more hashes in the hash table.

* * * * *